(12) United States Patent
Fanning

(10) Patent No.: US 6,467,031 B1
(45) Date of Patent: Oct. 15, 2002

(54) METHOD AND APPARATUS FOR REDUCING PROCESSOR BUS LOADING

(75) Inventor: Blaise B. Fanning, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/467,105

(22) Filed: Dec. 10, 1999

(51) Int. Cl.$^7$ ............................................. G06F 12/00
(52) U.S. Cl. ...................... 711/146; 711/119; 711/144; 711/145
(58) Field of Search ................. 711/146, 119, 711/144, 145; 710/127, 128, 307

(56) References Cited

U.S. PATENT DOCUMENTS

| | | | |
|---|---|---|---|
| 5,168,568 A | * 12/1992 | Thayer et al. | 395/725 |
| 5,228,134 A | * 7/1993 | MacWilliams et al. | 711/138 |
| 5,347,648 A | * 9/1994 | Stamm et al. | 714/5 |
| 5,600,814 A | * 2/1997 | Gahan et al. | 395/427 |
| 5,611,070 A | * 3/1997 | Heidelberger et al. | 395/460 |
| 5,802,572 A | * 9/1998 | Patel et al. | 711/128 |
| 5,913,226 A | * 6/1999 | Sato | 711/141 |
| 6,105,112 A | * 8/2000 | Arimilli et al. | 711/118 |
| 6,128,707 A | * 10/2000 | Arimilli et al. | 710/35 |

OTHER PUBLICATIONS

Sweazey, "VLSI Support for Copyback Caching Protocols on Futurebus," IEEE, pp. 240–246, 1988.*

* cited by examiner

Primary Examiner—Matthew Kim
Assistant Examiner—Stephen Elmore
(74) Attorney, Agent, or Firm—Blakely, Sokoloff, Taylor & Zafman LLP

(57) ABSTRACT

A method and apparatus to reduce processor bus loading is provided. A method of reducing processor bus loading in a system having a processor with a first processor bus granularity, a memory controller, and an ownership tracker. First, a set of data is requested from a memory controller, the set of data being smaller than the processor bus granularity. If the memory controller does not own the set of data, performing a processor bus snoop to determine if a processor cache owns the set of data. If the processor cache owns the set of data, assigning ownership of a block of data having a size equal to the processor bus granularity to the memory controller. The memory controller returning the set of data requested by an I/O agent to the I/O agent.

21 Claims, 7 Drawing Sheets

METHOD AND APPARATUS FOR REDUCING PROCESSOR BUS LOADING

FIELD OF THE INVENTION

The present invention relates to an input/output agent accessing memory, and more specifically, to the I/O agent accessing coherent cache lines.

BACKGROUND

Maintaining cache coherency between I/O agents and processor agents generally requires a single coherency point to communicate the state of cache lines between the entities that might want to access them. Traditionally, this coherency point has been the processor bus. Thus, all accesses to coherent cache lines have been required to traverse this coherency point in order to properly sequence accesses to coherent memory between agents.

FIG. 1 illustrates a flowchart of a prior art memory access by an I/O agent. The process starts at block 110.

At block 120, the I/O agent sends a request for 16 bytes of information to the memory controller. The I/O agent generally addresses the memory controller that forwards I/O agent requests appropriately.

At block 130, the memory controller initiates a snoop of the processor bus to determine ownership of the data. Generally, for cache coherency reasons, the processor bus is snooped.

At block 140, the process determines whether the processor cache owns the data. If the processor cache owns the data, the processor returns the 16 bytes of data to the I/O agent.

If the processor does not own the data, the memory controller obtains the data from the memory and returns the requested 16 bytes of data to the I/O agent.

This method is reasonable, as long as the access sizes used by the I/O agent are identical to the access granularity of the processor bus and memory. However, if the I/O devices attempt to access coherent memory at a finer granularity than that used by the processor bus, then the overhead on the processor bus balloons by the ratio of the bus access size to the I/O access size. For example, an I/O agent that attempts to access coherent memory 16 bytes at a time—as shown in FIG. 1—where the processor bus uses 64 byte granularity loads the processor bus at four times the rate of an I/O agent that uses 64 byte memory access. For systems in which the I/O devices access memory at a finer granularity than the granularity of the processor bus, the process shown in FIG. 1 is disadvantageous.

SUMMARY OF THE INVENTION

According to one aspect of the invention, a method of reducing processor bus loading in a system having a processor with a first processor bus granularity, a memory controller, and an ownership tracker is provided. First, a set of data is requested from a memory controller, the set of data being smaller than the processor bus granularity. If the memory controller does not own the set of data, the memory controller performs a processor bus snoop to determine if a processor cache owns the set of data. If the processor cache owns the set of data, the memory controller is assigned ownership of a block of data having a size equal to the processor bus granularity. The memory controller returns the set of data requested by an I/O agent to the I/O agent.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for reducing processor bus loading is described. This method and apparatus is for system where the granularity of accessing an I/O device is smaller than the granularity of accessing the processor bus. The apparatus includes an additional ownership tracker in the memory controller, for tracking ownership for successive accesses by the I/O device.

Figure 1:
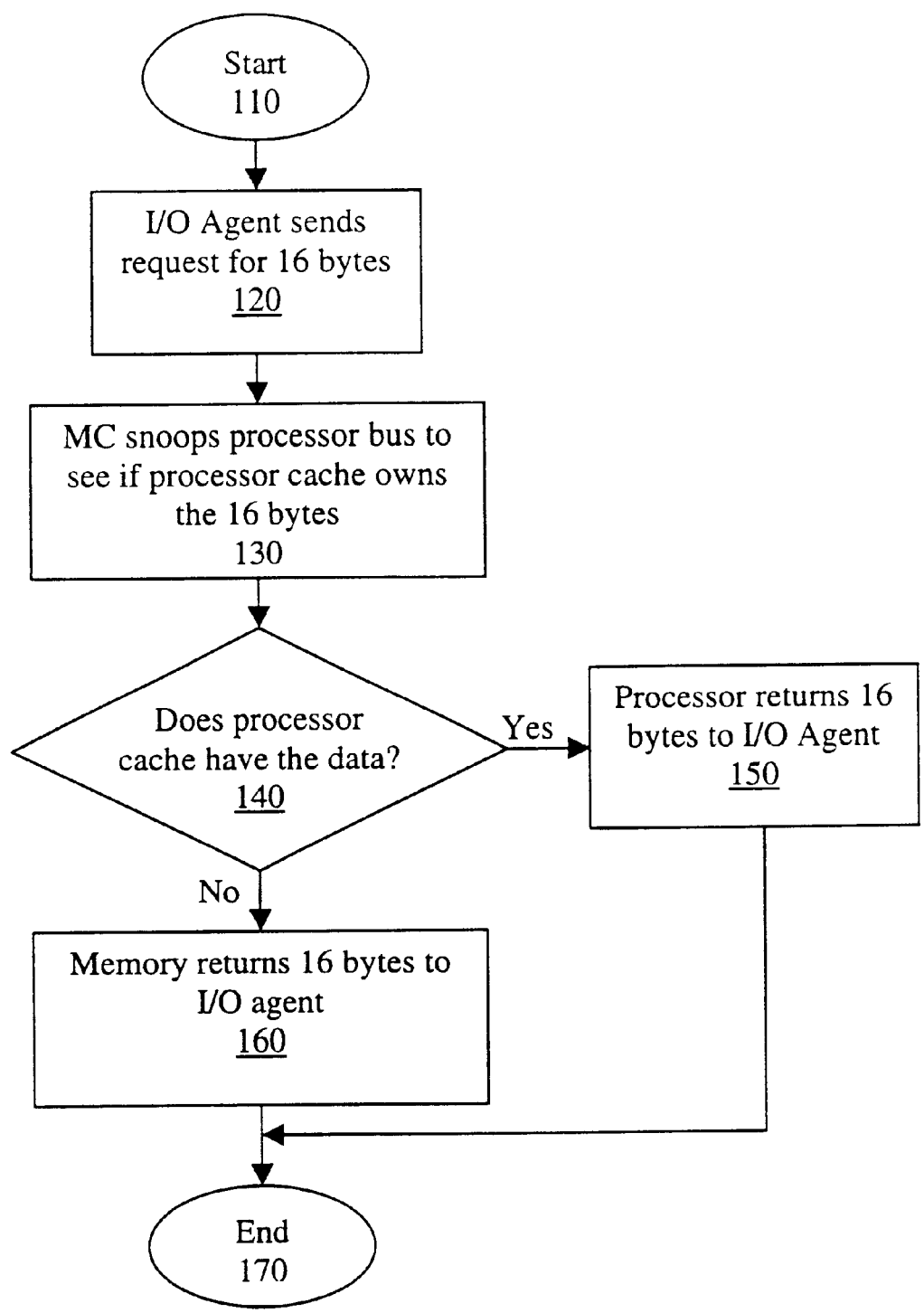
FIG. 1 is flowchart of a prior art memory access by an I/O agent.
Figure 2:
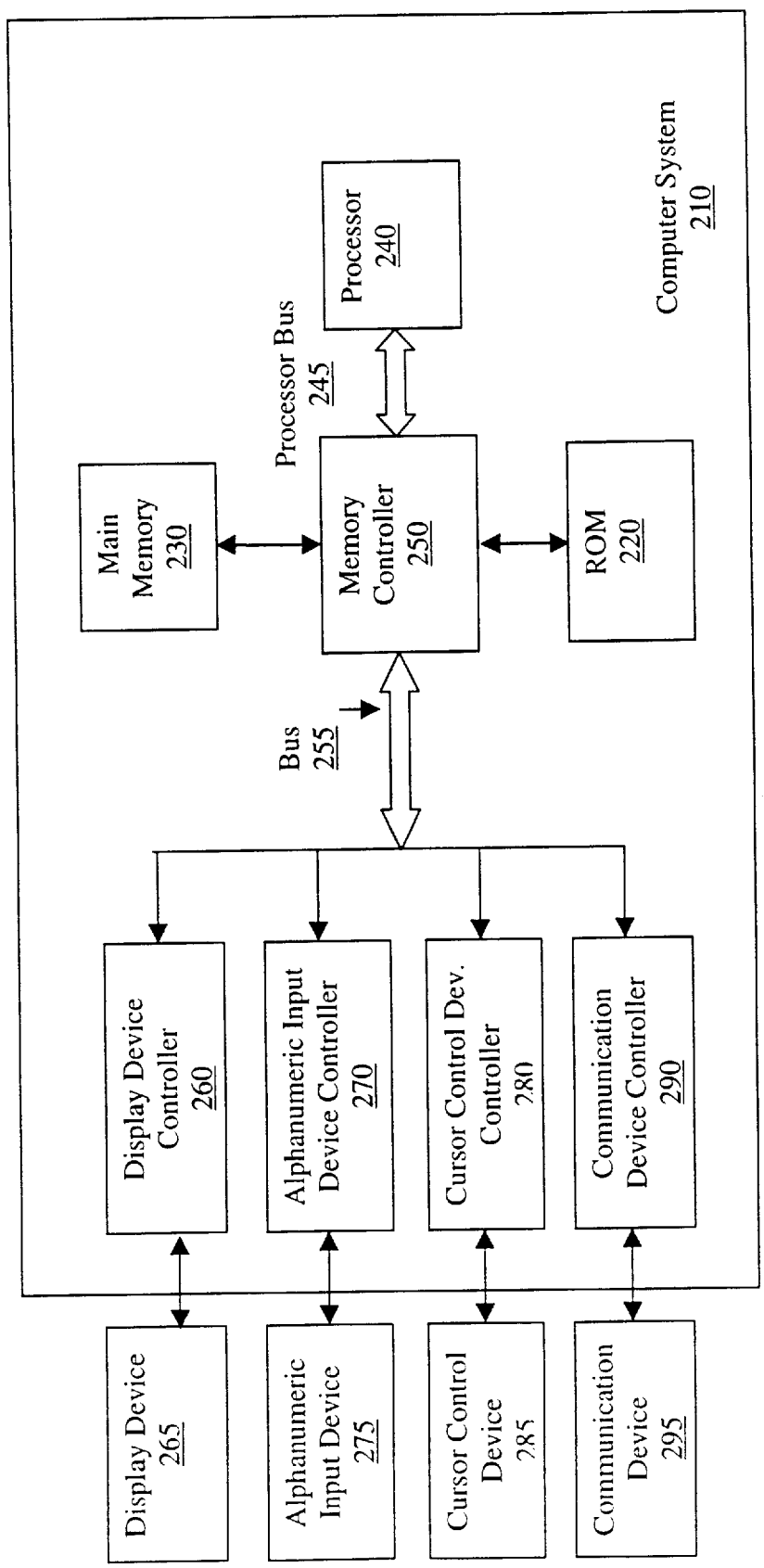
FIG. 2 is a block diagram of one embodiment of a computer system on which the present invention may be implemented.

FIG. 2 is one embodiment of computer system on which the present invention may be implemented. FIG. 2 illustrates a block diagram of certain elements of a typical data processing system upon which one embodiment of the present invention is implemented. It will be apparent to those of ordinary skill in the art, however that other alternative systems of various system architectures may also be used.

The data processing system illustrated in FIG. 2 includes a bus or other internal communication means 245 for communicating information, and a processor 240 coupled to the processor bus 245 for processing information.

The system further comprises a memory controller 250 coupled to the processor bus 245, to handle memory requests.

The system further comprises a random access memory (RAM) or other volatile storage device 230 (referred to as memory), coupled to memory controller 250 for storing information and instructions to be executed by processor 240. Main memory 230 also may be used for storing temporary variables or other intermediate information during execution of instructions by processor 240. The system also comprises a read only memory (ROM) and/or static storage device 220 coupled to memory controller 250 for storing static information and instructions for processor 240.

The system may further be coupled to a plurality of input/output (I/O) devices, and the computer system 210 may include device controllers for the I/O devices. These device controllers 260, 270, 280, 290 may also be referred to as I/O agents. A device controller controls the transfer of data from a computer to a peripheral device and vice versa. For example, display screens, keyboards, printers, use device controllers.

The I/O devices may include a display device 265, such as a cathode ray tube (CRT) or a liquid crystal display (LCD) for displaying information to a computer user. The display device 265 is coupled to display device controller 260, which is coupled to memory controller 250."

An alphanumeric input device 275, including alphanumeric and other keys, may also be coupled to computer system 210 for communicating information and command selections to processor 240. The alphanumeric input device 275 is coupled to the alphanumeric input device controller 270, which is coupled to memory controller 250.

An additional user input device is cursor control device 285, such as a mouse, a trackball, stylus, or cursor direction keys coupled to memory controller 250 for communicating direction information and command selections to processor 240, and for controlling cursor movement on display device 265. The cursor control device 285 is coupled to memory controller 250 through cursor control device controller 280.

Another device that may optionally be coupled to computer system 210 is a communication device 295 for accessing other nodes of a distributed system via a network. The communication device 295 may include any of a number of commercially available networking peripheral devices such as those used for coupling to an Ethernet, token ring, Internet, or wide area network. The communication device 295 is coupled to memory controller 250 through communication device controller 290 and bus 255.

Note that any or all of the components of this system illustrated in FIG. 2 and associated hardware may be used in various embodiments of the present invention.

The system of the present invention may also be embodied in a handheld or portable device containing a subset of the computer hardware components described above. For example, the handheld device may be configured to contain only the processor bus 245, the processor 240, memory controller 250, memory 230, and a single input/output device (I/O device). The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

Figure 3:
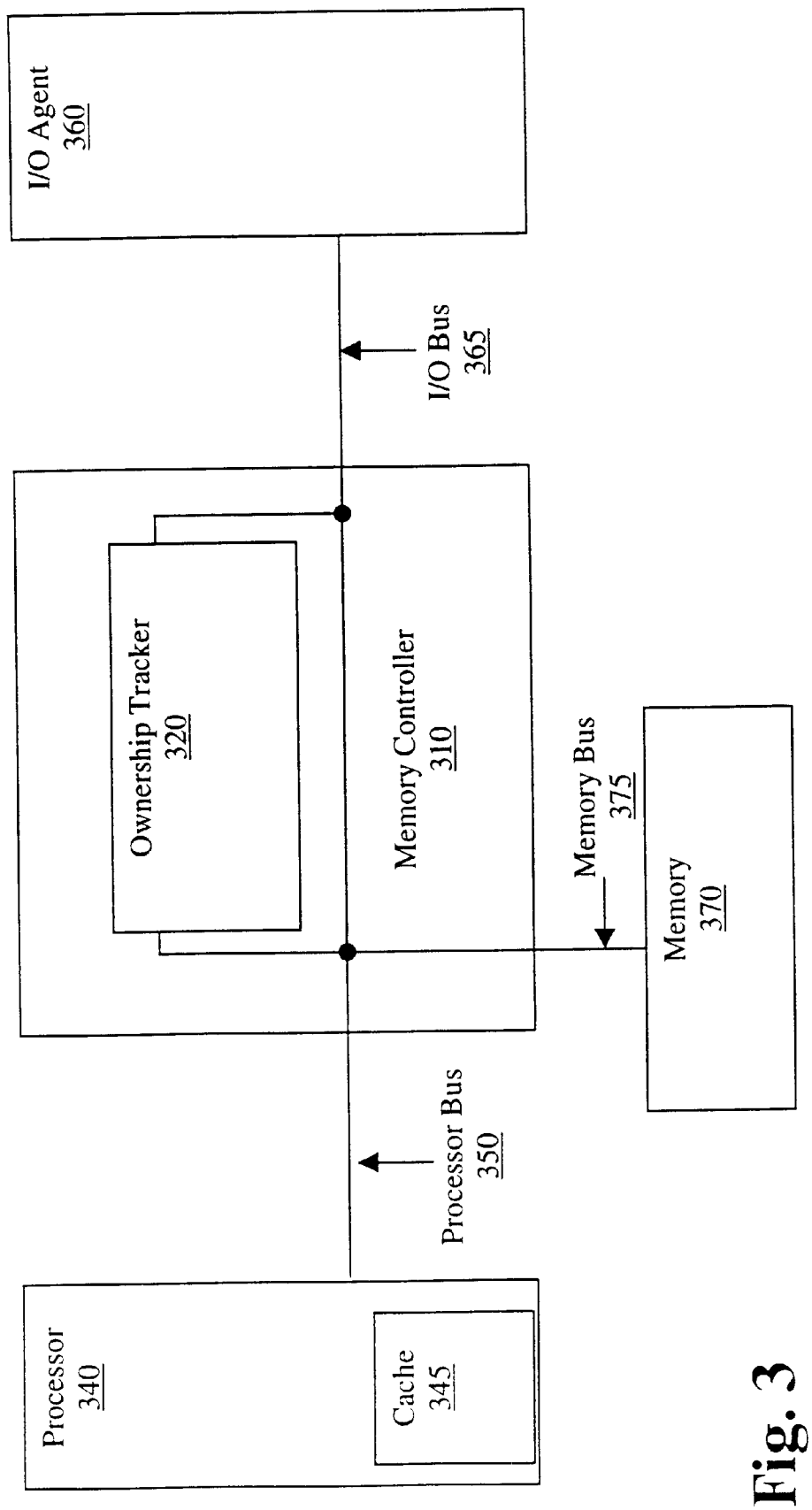
FIG. 3 is a block diagram of one embodiment of the coherency verification system according to the present invention.

FIG. 3 is a block diagram of one embodiment of the coherency verification system according to the present invention. The coherency verification system includes a memory controller 310 and an ownership tracker 320.

The memory controller 310 is coupled to processor 340 by processor bus 350. The processor bus 350 has granularity Y—i.e. a single item returned on the processor bus includes Y bytes. For one embodiment, processor bus 350 has a granularity of 64 bytes. For another embodiment, the processor bus 350 may have a granularity of 32 bytes, 128 bytes, or another size. Generally, as processing speeds increase, the atomic transfer size of the processor bus 350 is increased as well.

The memory controller 310 is further coupled to memory 370 by memory bus 390. For one embodiment, the memory 370 is a dynamic random access memory (DRAM). The memory bus 375 has a granularity of Z. For one embodiment, the granularity of the memory bus 375 is matched to the granularity of the processor bus.

An I/O agent 360 is also coupled to memory controller 310 through I/O bus 365. For one embodiment, the I/O agent 360 is a PCI agent, AGP agent, or other agent. The I/O agent 360 has an addressing granularity of X—i.e. a single item returned on the I/O bus 365 to I/O agent includes X bytes. For one embodiment, the I/O bus 365 may have a granularity of 16 bytes. For another embodiment, the I/O bus 365 may have a granularity of 8 bytes, 32 bytes, or another size.

The ownership tracker 320 permits certain accesses from the I/O agent 360 to be handled without performing a processor bus coherency operation.

The ownership tracker 320 assigns the ownership status of the requested data and data adjacent to the requested data by the I/O agent 360 to the memory controller 310. Whenever the ownership tracker already has an ownership status of a particular line, no coherency operations are performed when the I/O agent 360 accesses that particular line. If a line being accessed by the I/O agent 360 is not owned by the ownership tracker 320, a coherency operation is performed.

If the ownership tracker 320 "forgets" that it has ownership—i.e. stops registering that it owns the data—another coherency operation is done. Thus, having the ownership tracker 320 forget that it owns data is advantageous. For one embodiment, the ownership tracker 320 forgets that it has ownership of the data, thus reverting ownership of the data to the memory, when the last byte of data has been consumed—i.e. utilized—by the I/O agent 360. For one embodiment, if during an I/O operation, the processor wishes to alter the data that is owned by the ownership tracker 320, the processor may take back the data from the memory controller 310. This merely causes the next I/O agent request to perform a snoop operation, as described above.

For one embodiment, the ownership tracker 320 has a FIFO, first-in first-out, storing methodology. The ownership tracker 320 has a size greater than twice the size of the processor bus granularity. Thus, when the ownership tracker 320 becomes full, the old data is "forgotten" even if the data has not been consumed.

Figure 4:
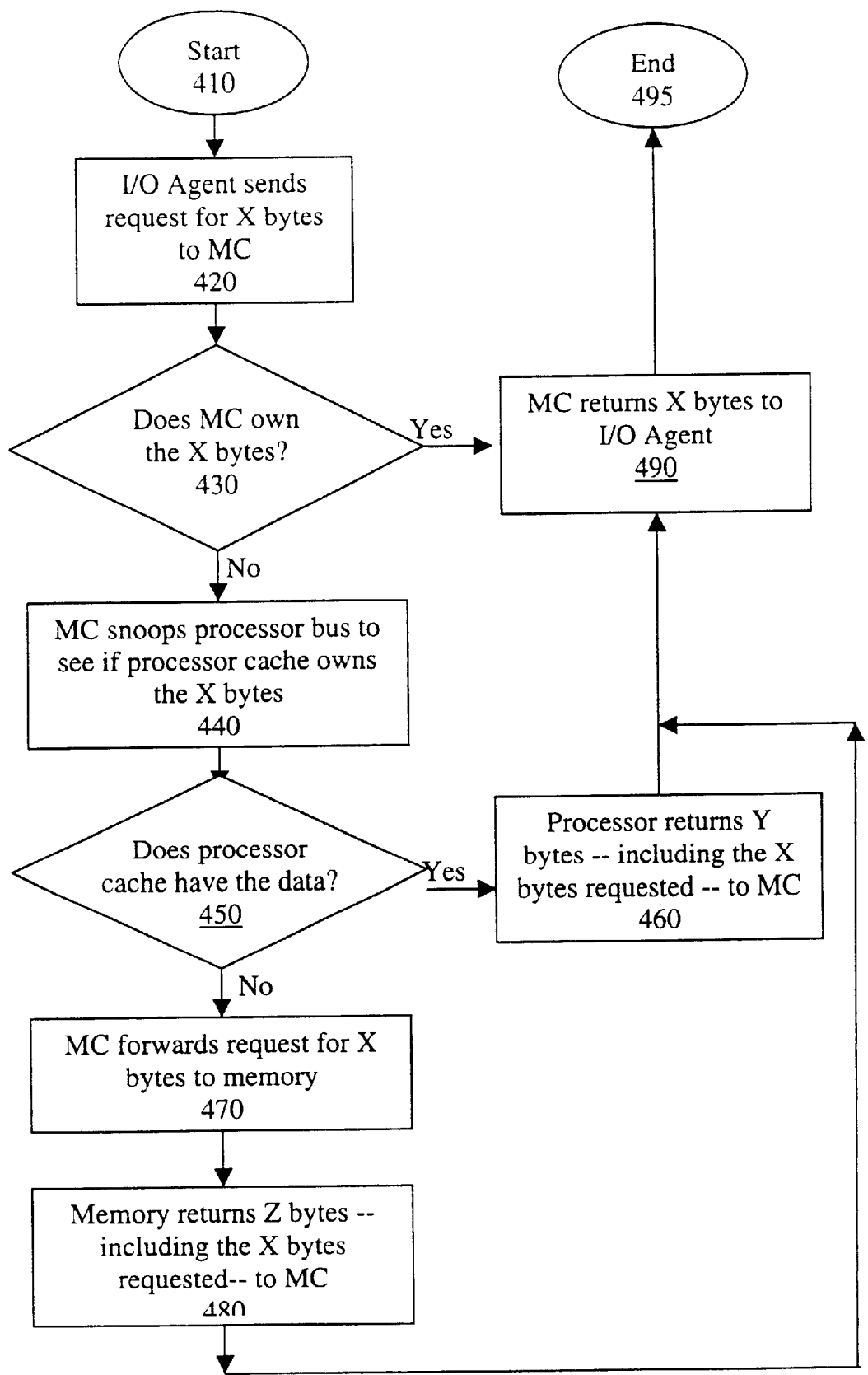
FIG. 4 is a flowchart of a memory access by an I/O agent.
Figure 5:
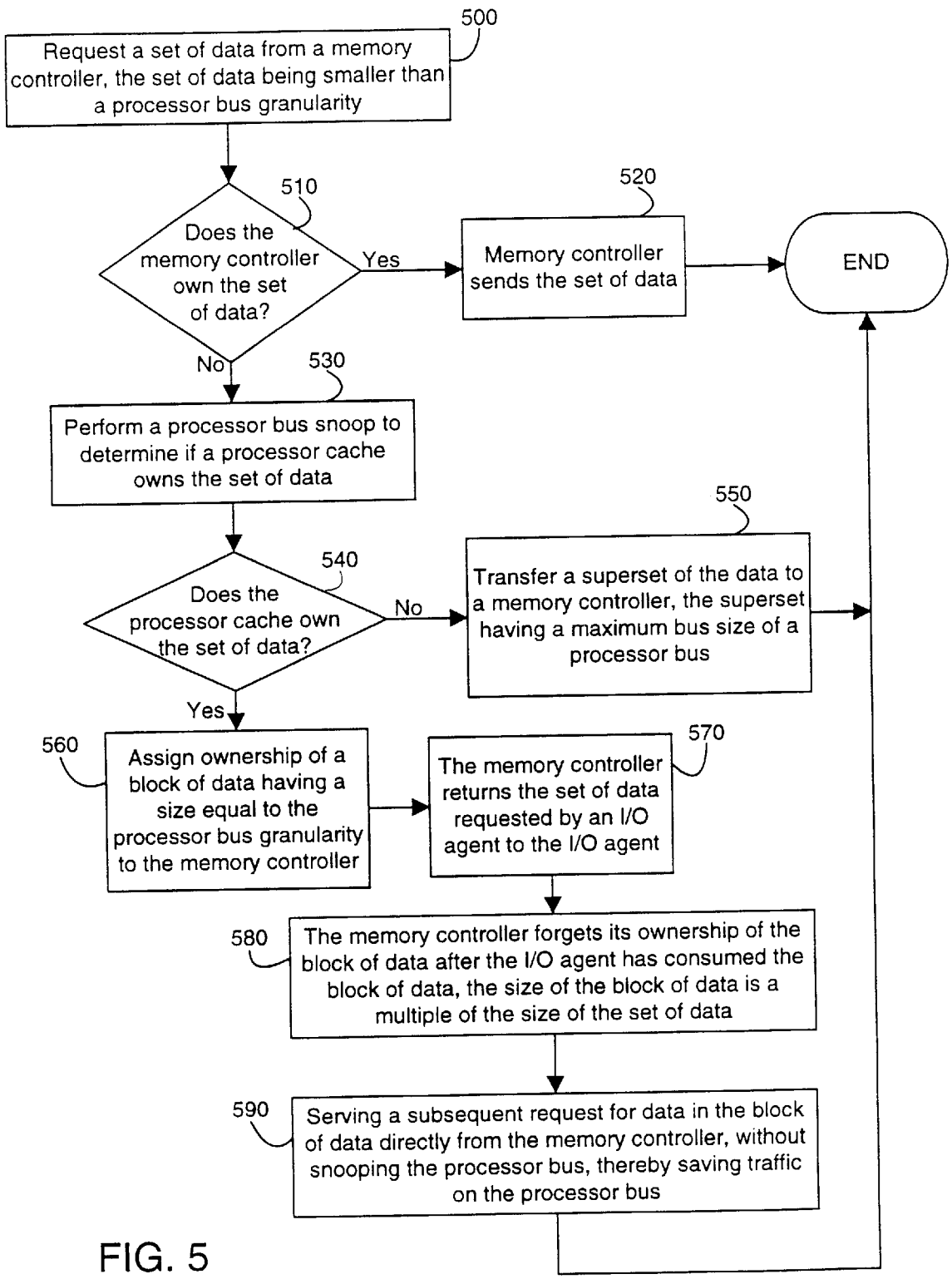
FIG. 5 is a flowchart of one embodiment of a memory request by a processor.
Figure 6:
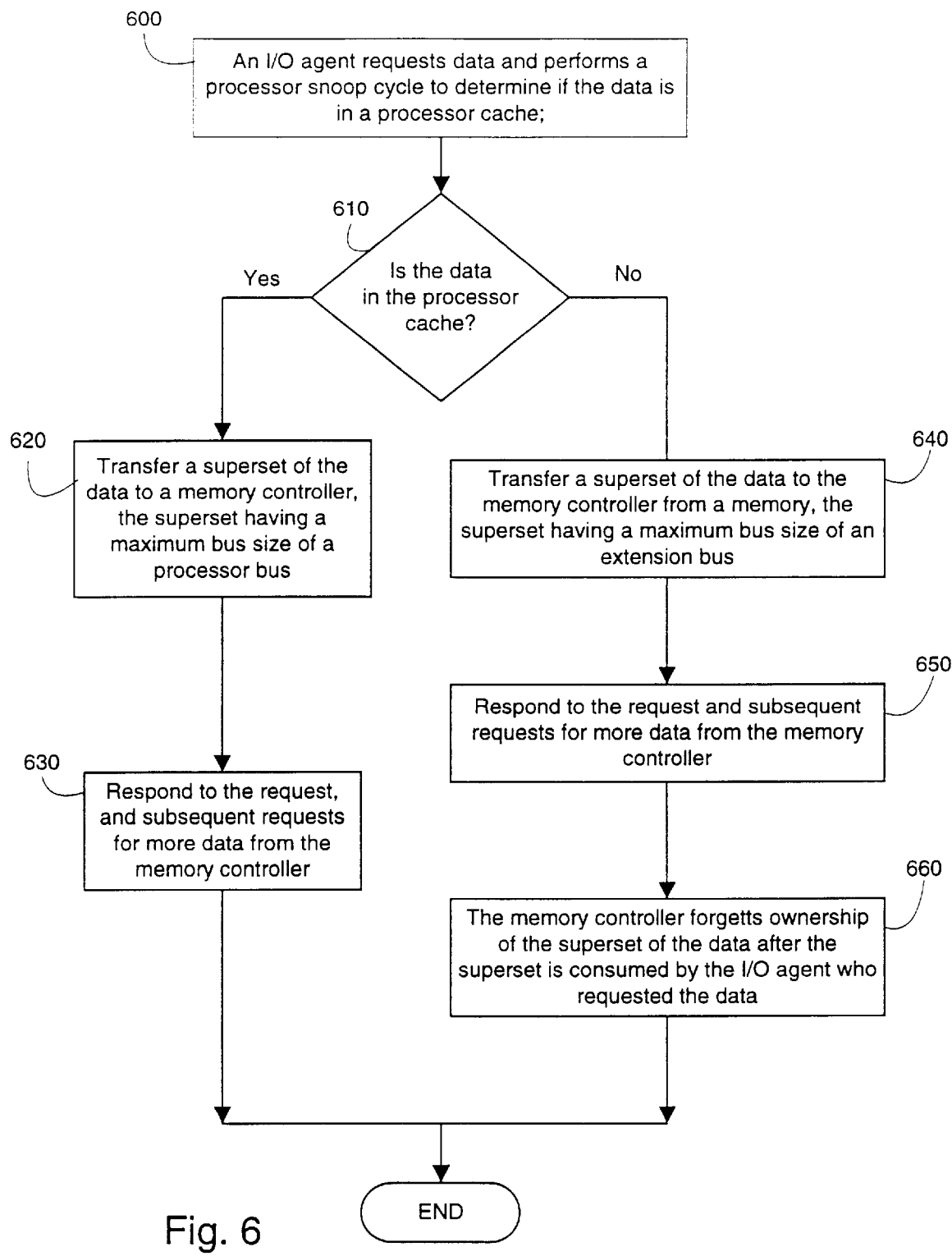
FIG. 6 is a flowchart of one embodiment of a memory request by an I/O agent.
Figure 7:
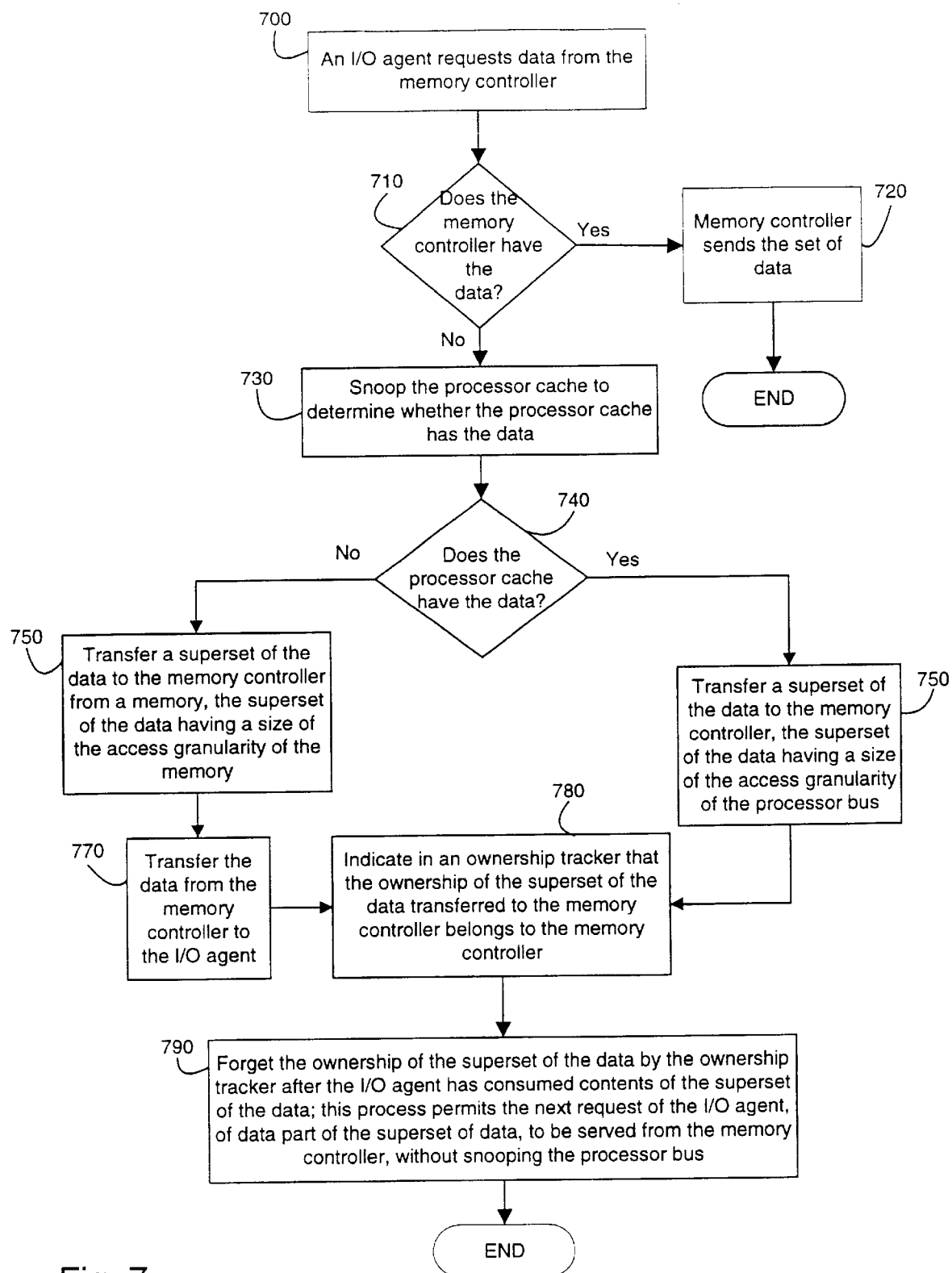
FIG. 7 is a flowchart of another embodiment of a memory request by an I/O agent.

FIG. 4 is a flowchart of a memory access by an I/O agent. The process starts at block 410.

At block 420, the I/O agent sends a request for X bytes to the memory controller. For one embodiment, the X bytes represents the granularity of the I/O bus. For one embodiment, the X bytes are 16 bytes.

At block 430, the process determines whether the memory controller already owns the X bytes requested by the I/O agent. As described above, and discussed in more detail below, the memory controller can own data. If the memory controller owns the X bytes requested, the process continues to block 490. At block 490, the memory controller returns the X bytes to the I/O agent. The process then ends at block 495.

If the memory controller does not own the X bytes requested, the process continues to block 440. At block 440, the memory controller snoops the processor bus to determine whether the data is in the processor cache.

At block 450, the process determines whether the processor cache has the X bytes of data. If the processor cache has the X bytes of data, the process continues to block 460.

At block 460, the processor returns Y bytes of data to the memory controller. The Y bytes of memory correspond to the X bytes requested plus succeeding bytes. For one embodiment, the Y bytes correspond to the granularity of the processor bus. Generally, the processor bus granularity is greater than X bytes, the size of the I/O agent's request. The processor returns the Y bytes to the memory controller, from the cache. The ownership tracker now indicates that the memory controller owns the Y bytes.

The process then continues to block 490, where the memory controller returns the X bytes to the I/O agent. The memory controller now owns the remaining (Y−X) bytes. Thus, if the I/O agent requests the subsequent X' bytes (i.e. the next set of data after the X bytes), the memory controller will be able to return the data to the I/O agent, without snooping the processor bus. This reduces the load on the processor bus, in proportion to the ratio of the processor bus granularity and the I/O agent request size (i.e. Y/X).

If, at block 450, it was found that the data was not in the processor cache, the process continues to block 470. At block 470, the memory controller requests the X bytes from memory. Since the data was not owned by the processor cache or by the memory controller, the data is owned by memory. For one embodiment, multiple processor caches may be checked at block 450.

At block 480, the memory returns Z bytes to the memory controller. The Z bytes correspond to at least the X bytes requested. For one embodiment, the Z bytes correspond to the granularity of memory access. Generally, the granularity of memory access equals the granularity of the processor bus, i.e. Y=Z.

The process then continues to block 490 where the memory controller returns the X bytes to the I/O agent. The memory controller now owns the remaining (Z−X) bytes. Thus, if the I/O agent requests the subsequent X' bytes (i.e. the next set of data after the X bytes), the memory controller will be able to return the data to the I/O agent, without snooping the processor bus or accessing memory. This reduces the load on the processor bus, in proportion to the ratio of the memory access granularity and the I/O agent request size (i.e. Z/X).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of reducing processor bus loading comprising:
   requesting a set of data from a memory controller, the set of data being smaller than a processor bus granularity;
   if the memory controller does not own the set of data, performing a processor bus snoop to determine if a processor cache owns the set of data;
   if the processor cache owns the set of data,
   assigning ownership of a block of data having a size equal to the processor bus granularity to the memory controller; and
   the memory controller returning the set of data requested by an I/O agent to the I/O agent.

2. The method of claim 1, further comprising:
   the memory controller forgetting its ownership of the block of data after the I/O agent has consumed the block of data.

3. The method of claim 1, further comprising if the processor cache does not own the set of data, further comprising:
   receiving a block of data having a size equal to memory access granularity from a memory, the block of data including the set of data requested by the I/O agent.

4. The method of claim 1, wherein a size of the set of data requested by the I/O agent is a granularity of the I/O agent access.

5. The method of claim 4, wherein a size of the block of data is a granularity of the processor bus.

6. The method of claim 5, wherein the size of the block of data is a multiple of the size of the set of data.

7. The method of claim 1, wherein a subsequent request for data in the block of data is served directly from the memory controller, without snooping the processor bus, thereby saving traffic on the processor bus.

8. A method of reducing processor bus loading comprising:
   an I/O agent requesting data;
   performing a processor snoop cycle to determine if the data is in a processor cache; and
   if the data is in the processor cache:
     transferring a superset of the data to a memory controller, the superset having a maximum bus size of a processor bus; and
     responding to the request, and subsequent requests for more data from the memory controller; and
   if the data is not in the processor cache:
     transferring a superset of the data to the memory controller from a memory, the superset having a maximum bus size of an extension bus;
     responding to the request and subsequent requests for more data from the memory controller; and
     the memory controller forgetting ownership of the superset of the data after the superset is consumed by the I/O agent who requested the data.

9. A method of reducing processor bus loading comprising:
   an I/O agent requesting data from a memory controller;
   if the memory controller does not have the data,
   snooping a processor cache to determine whether the processor cache has the data;
   if the processor cache has the data, transferring a superset of the data to the memory controller, the superset of the data having a size of the access granularity of the processor bus;
   if the processor cache does not have the data, transferring a superset of the data to the memory controller from a memory, the superset of the data having a size of the access granularity of the memory; and
   transferring the data from the memory controller to the I/O agent.

10. The method of claim 9, further comprising indicating in an ownership tracker that the ownership of the superset of the data transferred to the memory controller belongs to the memory controller.

11. The method of claim 10, further comprising forgetting the ownership of the superset of the data by the ownership tracker after the I/O agent has consumed contents of the superset of the data.

12. The method of claim 9, wherein a next request of the I/O agent, for the requested data of the superset of data, is served from the memory controller, without snooping the processor bus.

13. An apparatus for reducing processor bus loading comprising:
   a first device for requesting a set of data from a memory controller;
   an ownership tracker for testing whether the memory controller owns the set of data, and returning the set of data to the first device if the memory controller owns the set of data;
   a processor bus for being snooped to determine whether a processor cache owns the set of data, and replying to the memory controller with a superset of data including the set of data, such that the memory controller returns the set of data to the first device;

the memory controller for servicing a subsequent request of the first device for data in the superset, without requiring a snoop of the processor bus.

14. The apparatus of claim 13, the ownership tracker further for forgetting ownership of the superset of the data, when the superset of the data has been consumed by the first device.

15. The apparatus of claim 13, wherein the first device is an I/O agent.

16. The apparatus of claim 13, wherein a size of the set of data is a granularity of access to the first device.

17. The apparatus of claim 13, wherein a size of the superset of data is a granularity of the processor bus.

18. The apparatus of claim 13, wherein a size of the superset of data returned by the processor bus is a multiple of a size of the set of data.

19. The apparatus of claim 13, further comprising:

a memory for returning a superset of data to the memory controller, if the processor cache did not own the set of data requested.

20. The apparatus of claim 19, wherein a size of the superset of data returned by the memory is a granularity of memory access.

21. The apparatus of claim 20, wherein the granularity of memory access equals a granularity of the processor bus.

* * * * *